No. 855,508. PATENTED JUNE 4, 1907.
S. R. ESTEP.
VEHICLE.
APPLICATION FILED NOV. 6, 1906.
2 SHEETS—SHEET 1.
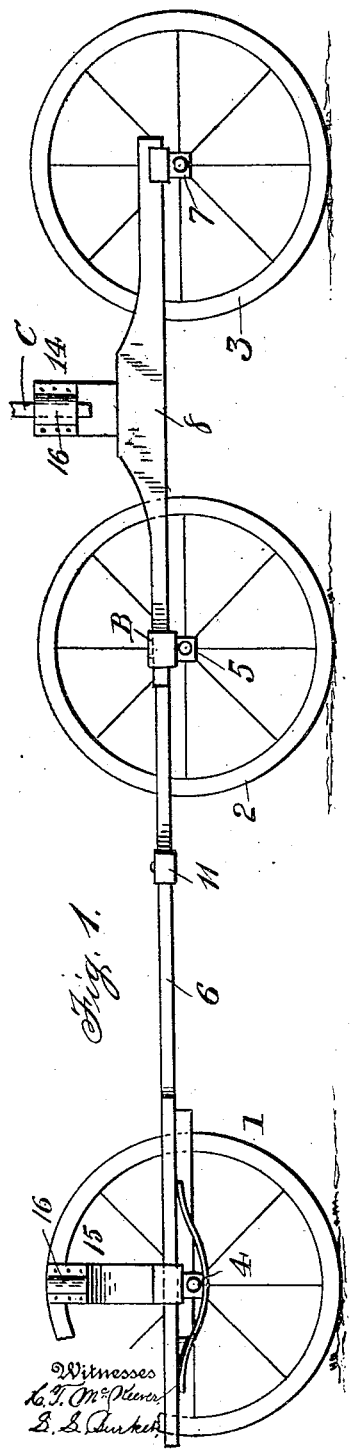
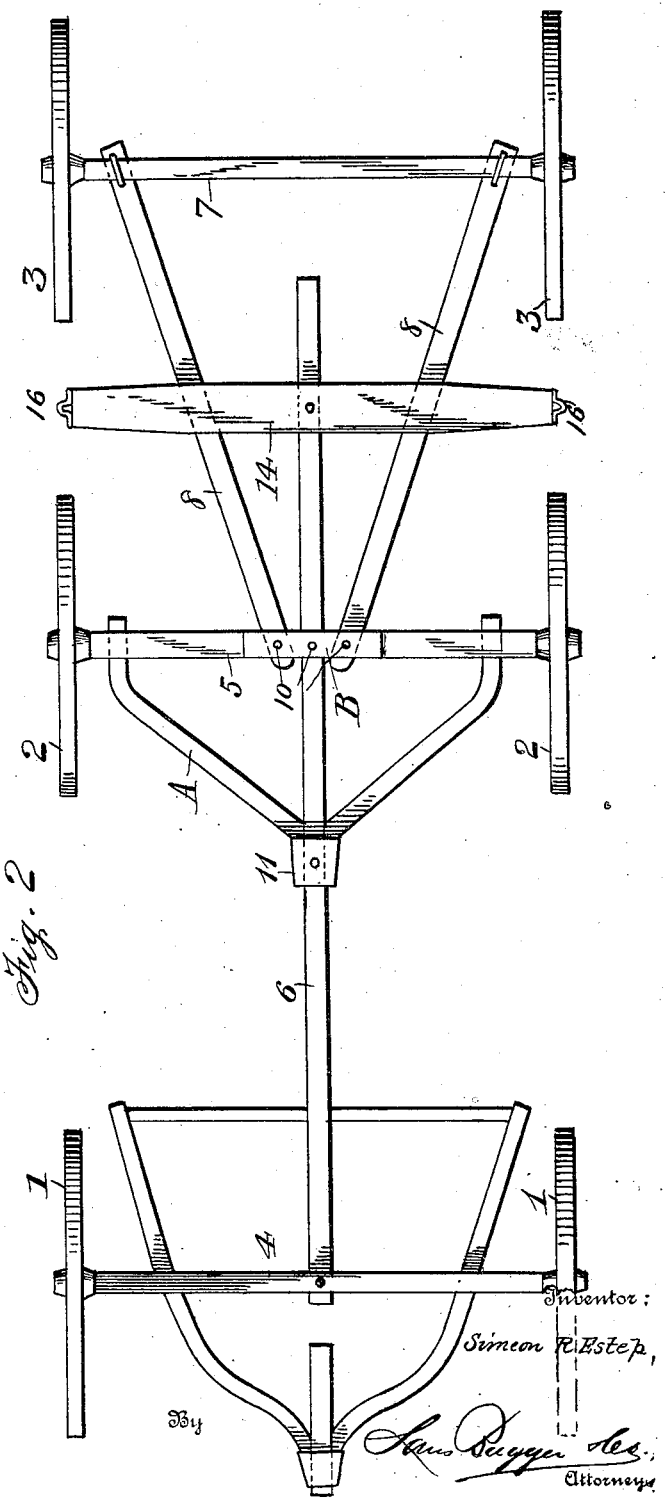

No. 855,508. PATENTED JUNE 4, 1907.
S. R. ESTEP.
VEHICLE.
APPLICATION FILED NOV. 6, 1906.
2 SHEETS—SHEET 2.
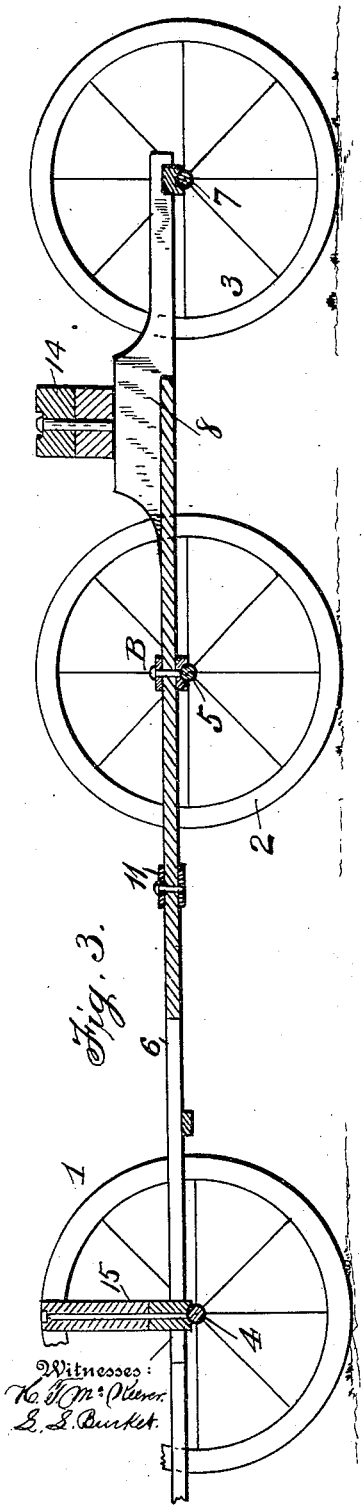
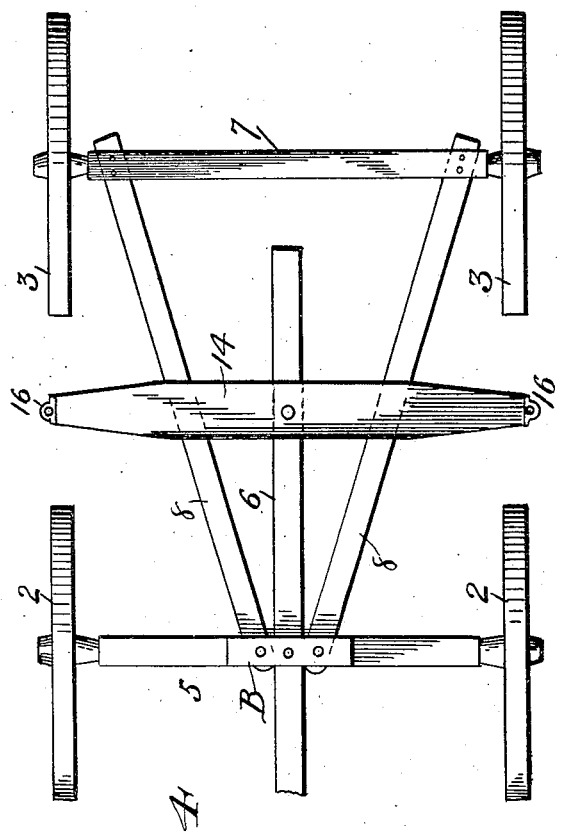
Witnesses:
Inventor:
Simeon R. Estep,
By
Attorneys.

UNITED STATES PATENT OFFICE.

SIMEON R. ESTEP, OF LAKE BUTLER, FLORIDA.

VEHICLE.

No. 855,508.   Specification of Letters Patent.   Patented June 4, 1907.

Application filed November 6, 1906. Serial No. 342,262.

*To all whom it may concern:*

Be it known that I, SIMEON R. ESTEP, a citizen of the United States, residing at Lake Butler, in the county of Bradford and State of Florida, have invented certain new and useful Improvements in Vehicles, of which the following is a specification.

My invention relates to improvements in vehicles, more especially for lumber. Its objects are principally to distribute the weight upon the running gear; to equalize the draft; and to facilitate the running action of the vehicle.

Said invention consists of certain structural features or instrumentalities substantially as hereinafter fully disclosed and specifically pointed out by the claims.

In the accompanying drawing illustrating the preferred embodiment of my invention—Figure 1 is a side elevation thereof. Fig. 2 is a plan view of the same. Fig. 3 is a longitudinal section thereof, and Fig. 4 is a broken detached plan view of the salient feature of the invention.

In carrying out my invention, I preferably employ a running-gear embracing three pairs of wheels 1, 2 and 3, all of the latter being practically of the same size or diameter, with the front pair connected by the usual coupling pole or reach 6 to the intermediate pair. Said pole or reach has its forward end connected to the forward axle 4 of the front pair of wheels, a retaining pin passing through said pole and through a cuff or sleeve 11 fixed to the forward end of a second hounds-like connection A of axle 5 of the intermediate pair of wheels 2. Said reach or pole 6, passing back centrally between the intermediate axle and a superposed bar-member B fixed to the latter, extends some distance still farther rearward from said intermediate axle 5, the purpose of which will be apparent presently.

The rearmost pair of wheels has its axle 7 suitably connected or coupled to the rear divergent ends of two inclined bars 8 extending forward and having their convergent ends also passed, and held between the intermediate axle 5 and the retaining bar-member B; suitable securing pins or bolts 10 being inserted vertically through said parts as shown.

A bolster-member 14, suitably equipped at its ends with keepers or clips 16 to receive load-retaining standards C, is suitably fixed or secured upon or across the inclined bars 8, the latter bars and said bolster-member 14 being of such construction or outline as to elevate the upper surface of said member to a height in alinement with a plane passing just above the wheels aforesaid; a like bolster-member 15, also being secured and borne upon the axle of the forward pair of wheels and having its upper surface in alinement with the corresponding surface of the bolster-like member 14 and accordingly having the same height as the latter with relation to the vehicle-wheels. As will doubtless be appreciated, the purpose of the aforesaid arrangement of parts is to remove or elevate the lumber, loaded upon the bolster-like members 14, 15 of the running-gear, to a point where it will be out of the plane of the movement of the wheels, traveling straight-ahead or turning, and whereby the weight of the load is distributed over the carrying or bearing members of the vehicle both as relates to the axles and wheels and intermediately thereof, and which will accommodate timber, logs or lumber of unusual length or dimensions as also that of common dimensions, all of which will be readily appreciated. It will also be noted that the coupling pole or reach 6 may be readily adjusted or moved longitudinally as usual in varying, or increasing and decreasing the distance apart between the forward and intermediate pairs of wheels, more especially.

I claim—

1. A vehicle of the character described, comprising a plurality of pairs of wheels and axles, the forward axle having a bolster-member, a reach connected to parts applied to the forward and intermediate axles and extending rearward beyond said intermediate axle and connected to a bolster-member applied to opposite bars having their rear divergent ends connected to the rearmost axle and their forward convergent ends connected to the intermediate axle, said bolster-members having their upper surfaces arranged relatively above the wheels.

2. A vehicle of the character described, comprising a plurality of pairs of wheels and axles, the forward axle having a bolster-member, a reach connected to parts applied to the forward axle, and passed through a sleeve of hounds-like arms of the intermediate axle, and between and connected to said intermediate axle and a bolster-like member secured to bars having their forward convergent ends connected to parts applied to said intermediate axle, the rear divergent ends of said bars being connected to the rearmost axle, said bolster-members having their upper surfaces arranged relatively above the wheel.

3. A vehicle of the character described, comprising a plurality of pairs of wheels and axles, the forward axle having a bolster-member, a reach connected to parts applied to the forward axle and passed through a sleeve of hounds-like arms of the intermediate axle, and between and connected to said intermediate axle, and a bolster-like member secured to bars having their forward ends connected to parts applied to said intermediate axle, the rear ends of said latter bars being connected to the rearmost axle said reach extending from the forward axle to, and beyond said intermediate axle and still farther rearward to, and beyond the bolster-like member secured in rear of said intermediate axle thus controlling the two rear pairs of wheels and axles from the front axle.

4. A vehicle of the character described, comprising a plurality of pairs of wheels and axles, the front axle having a bolster member, a reach connected to parts applied to the front axle and passed through a sleeve of hounds-like arms of the intermediate axle and a bolster-like member secured to and between said intermediate axle, bars having their forward ends connected to parts applied to said intermediate axle and having their rear ends connected to the rearmost axle, said bars having central upraised portions, and a bolster-like member carried upon said upraised portions and king-bolt connected to the rear end portion of said reach.

In testimony whereof I affix my signature, in presence of two witnesses.

SIMEON R. ESTEP.

Witnesses:
C. A. RITCH,
E. L. ODOM.